US009631605B2

(12) United States Patent
Neubauer et al.

(10) Patent No.: US 9,631,605 B2
(45) Date of Patent: Apr. 25, 2017

(54) PITCH SYSTEM FOR A WIND TURBINE

(75) Inventors: Jesper Lykkegaard Neubauer, Hornslet (DK); Ole Mølgaard Jeppesen, Skjern (DK); Robert Rowntree, Cheshire (GB); Leif Christoffersen, Vejle Ø (DK); Peter Bøttcher, Aarhus N (DK); Gerry Madden, Leighton Buzzard (GB)

(73) Assignee: Vestas Wind Systems A/S, Aarhus N. (DK)

( * ) Notice: Subject to any disclaimer, the term of this patent is extended or adjusted under 35 U.S.C. 154(b) by 729 days.

(21) Appl. No.: 13/989,340

(22) PCT Filed: Nov. 25, 2011

(86) PCT No.: PCT/DK2011/050452
§ 371 (c)(1),
(2), (4) Date: Jun. 5, 2014

(87) PCT Pub. No.: WO2012/069062
PCT Pub. Date: May 31, 2012

(65) Prior Publication Data
US 2014/0301847 A1   Oct. 9, 2014

Related U.S. Application Data

(60) Provisional application No. 61/417,335, filed on Nov. 26, 2010, provisional application No. 61/420,940, filed on Dec. 8, 2010.

(30) Foreign Application Priority Data

Nov. 26, 2010   (DK) ................................ 2010 70510
Dec. 8, 2010   (GB) .................................. 1020828.8

(51) Int. Cl.
F03D 1/06      (2006.01)
F03D 7/02      (2006.01)
F03D 80/70     (2016.01)

(52) U.S. Cl.
CPC ......... *F03D 7/0224* (2013.01); *F03D 1/0658* (2013.01); *F03D 1/0691* (2013.01);
(Continued)

(58) Field of Classification Search
None
See application file for complete search history.

(56) References Cited

U.S. PATENT DOCUMENTS 6,783,326 B2 *   8/2004   Weitkamp ............. F03D 7/0224
                                                            416/1
8,459,946 B2 *   6/2013   Yoshida ................ F03D 7/0224
                                                            416/153
(Continued)

FOREIGN PATENT DOCUMENTS

AU        2008320935 A1       12/2009
AU        2009337882 A1       10/2010
(Continued)

OTHER PUBLICATIONS

International Searching Authority, Search Report and Written Opinion issued in corresponding International No. PCT/DK2011/050452 dated Apr. 4, 2012, 13 pages.
(Continued)

*Primary Examiner* — Craig Kim
*Assistant Examiner* — Jason Davis
(74) *Attorney, Agent, or Firm* — Wood Herron & Evans LLP (57) ABSTRACT

A pitch system (20) for rotating a blade (4) of a wind turbine relative to a hub (6) generally comprises a bearing (22) having an inner bearing ring (30) configured to be mounted to the hub and an outer bearing ring (32) configured to be mounted to the blade. A first coupling member (24) positioned between the hub and inner bearing ring extends radially inward. A second coupling member (26) positioned between the blade and outer bearing ring extends radially inward and over the inner bearing ring. A drive system (28) includes a first drive member (34) coupled to the first coupling member and a first driven member (36) coupled to the second coupling member. The first drive member is configured to move the first driven member to rotate the
(Continued)

outer bearing ring relative to the inner bearing ring and thereby pitch the blade.

23 Claims, 8 Drawing Sheets

(52) U.S. Cl.
CPC ............ *F03D 80/70* (2016.05); *Y02E 10/721* (2013.01); *Y02E 10/723* (2013.01)

(56) References Cited

U.S. PATENT DOCUMENTS

| | | | |
|---|---|---|---|
| 8,915,715 B2 * | 12/2014 | Schroppel | F03D 7/0224 416/174 |
| 2008/0191488 A1 | 8/2008 | Kirchner et al. | |
| 2009/0016885 A1 | 1/2009 | Bech | |
| 2009/0175724 A1 * | 7/2009 | Russ | F03D 1/0658 416/131 |
| 2011/0020136 A1 * | 1/2011 | Numajiri | F03D 7/0224 416/246 |

FOREIGN PATENT DOCUMENTS

| | | | | |
|---|---|---|---|---|
| DE | 202005007450 U1 | 7/2005 | | |
| GB | 2486405 A | 6/2012 | | |
| JP | WO 2009150713 A1 * | 12/2009 | ........... | F03D 7/0224 |
| WO | 2009048402 A1 | 4/2009 | | |

OTHER PUBLICATIONS

European Patent Office, Official Action issued in Application No. 11 791 426.7 dated Aug. 25, 2015.
European Patent Office, Official Action issued in Application No. 11 791 426.7 dated May 12, 2016.

* cited by examiner

PITCH SYSTEM FOR A WIND TURBINE

CROSS-REFERENCE

This application claims the benefit of U.S. Provisional Patent Application No. 61/417,335 and Danish Patent Application PA 2010 70510, both of which were filed on Nov. 26, 2010 and are entitled "A WIND TURBINE AND A METHOD FOR PITCHING A BLADE OF A WIND TURBINE". This application also claims the benefit of U.S. Provisional Patent Application No. 61/420,940 and U.K. Patent Application No. 1020828.8, both of which were filed on Dec. 8, 2010 and are entitled "MOUNTING ARRANGEMENT FOR PITCH GEAR". The disclosures of all cross-referenced applications are fully incorporated herein by reference.

TECHNICAL FIELD

This invention relates to a pitch system for rotating a blade of a wind turbine relative to a hub, along with a wind turbine incorporating a pitch system.

BACKGROUND

Wind turbines typically include a rotor with large blades driven by the wind. The blades convert the kinetic energy of the wind into rotational mechanical energy. The mechanical energy is typically transferred via drive train to a generator, which then converts the energy into electrical power.

Most modern wind turbines control power output by pitching the blades relative to the wind. Thus, each blade is mounted to a hub by a blade bearing that allows relative movement between the blade and the hub. The blades are rotated about their longitudinal axis by a pitch system that includes one or more electrical drives (e.g., electrical motors) or hydraulic drives (e.g., hydraulic actuators). Although a single drive may be used to collectively pitch the blades, the pitch systems in most modern wind turbines include drives for pitching each blade individually.

There are various ways of implementing a pitch system. Most designs, however, mount the blade to an inner ring of the blade bearing and the hub to an outer ring of the blade bearing. Such an arrangement makes it easier connect the pitch drive, which is typically mounted to the hub, to the blade via rods, gears, or other mechanical links. Additionally, the elements of the pitch system in such an arrangement can in large part be contained within the interior of the hub (and possibly blade), which is generally desirable. And finally, such an arrangement helps ensure that the hub remains large enough to have the necessary structural rigidity to withstand loads and/or have the necessary interior space to accommodate service personnel.

Over time there has been a significant increase in the overall size of wind turbines because of the desire to capture more of the wind's available energy. As the hub—typically a casted component—has become larger, material costs present as much concern (or more) as the hub being a sufficient size for structural integrity. Mounting the inner rings of blade bearings to the hub rather than the blade represents an opportunity to decrease the size of the mounting areas and overall body of the hub, thereby saving material costs.

Although several designs have been proposed for mounting the hub to the inner ring of a blade bearing and the blade to the outer ring, there remains room for improvement. For example, connecting the hub-mounted pitch drive to the outer bearing ring/blade presents a challenge. Attempts to address this challenge have focused on mounting elements of the pitch system on the exterior of the hub. This is generally not considered practical for hydraulic pitch systems because of the stroke length of the actuator and mechanical links that would be needed to provide the required range of pitching. Only a compact electrical motor acting on a toothed ring connected to the outer bearing ring or blade is a viable option.

Indeed, for electrical pitch systems, such exterior placement is generally considered the only viable option for reasons relating to service and maintenance. The toothed ring is subject to wear and typically requires replacement during the lift time of the wind turbine. If located in the interior of the blade (e.g., mounted to an inner wall of the blade or the top of the outer bearing ring), the blade must typically be removed to replace the toothed ring. Thus, the complexity, costs, and downtime associated with the replacement of the toothed ring is significantly greater compared arrangements where the toothed ring is exterior-mounted such that blade removal is not required.

SUMMARY

A pitch system for rotating a blade of a wind turbine is described below. The pitch system generally comprises a bearing having an inner bearing ring configured to be mounted to a hub of the wind turbine and an outer bearing ring configured to be mounted to the blade. The outer bearing ring is rotatable relative to the inner bearing ring to pitch the blade relative to the hub. A first coupling member is positioned between the hub and inner bearing ring. A second coupling member positioned between the blade and outer bearing ring. The first coupling member extends radially inward, and the second coupling member extends radially inward and over the inner bearing ring. The pitch system also includes a drive system having a first drive member coupled to the first coupling member and a first driven member coupled to the second coupling member. The first drive member is configured to move the first driven member to rotate the outer bearing ring relative to the inner bearing ring.

Thus, with such an arrangement, the components of the drive system are advantageously located on the interior of the wind turbine (e.g., inside the hub, bearing, and/or blade). This helps protect the components from undesirable conditions (e.g., harsh weather) and allows them to be serviced from inside the wind turbine. At the same time, mounting the inner bearing to the hub helps save material costs. The mounting area for the bearing on the hub need not be as large compared to arrangements where the outer bearing ring is mounted to the hub. Therefore, the overall size of the hub can be kept to a minimum.

The first and second coupling members facilitate mounting of the drive system such that both electrical and hydraulic drive systems are possible. In an electrical system the first drive member may comprise a motor and pinion, and the second drive member may comprise a pitch gear (e.g., a toothed ring). In a hydraulic system the first drive member may comprise a hydraulic cylinder, and the first driven member may comprise a piston rod. More than one drive member and driven member may be provided to help reduce the required size/capacity of these components. Accordingly, the drive system may further comprise a second drive member coupled to the first coupling member and a second driven member coupled to the second coupling member.

Further advantages are possible when a hydraulic drive system is provided with such an arrangement. In particular, the first and second driven members may be arranged parallel to each other. This enables forces to be applied to the second coupling member (and, therefore, outer bearing ring) in a more symmetrical manner. In some embodiments, the coupling member includes annular portion overhanging the inner bearing ring and a beam portion spanning an opening defined by the annular portion. The first and second driven members are then coupled to the beam portion. The beam portion enables radial components of the forces applied by the first and second driven members to act against each other. This reduces or eliminates their effect on the outer bearing ring, which is desirable because the radial components do not contribute to the rotation of the bearing.

Even further, the components of the drive system apply forces in a manner the helps avoid stress concentrations in the outer bearing ring. In such embodiments the beam portion extends along a main axis. The first drive member and first driven are arranged along a first axis, and the second drive member and second driven member are arranged along a second axis. In a nominal position of the pitch system, the first axis and second axis intersect the main axis at a location over the outer bearing ring. Such an arrangement helps avoid moments that do not contribute to rotation at the locations where forces are applied to the outer bearing ring.

The first coupling member of the pitch system may be integrally formed with the hub. Alternatively, the first coupling member may be a separate component secured to the hub. In one embodiment the first coupling member comprises a plate-like member secured to the hub with bolts extending through the inner bearing ring and hub. The plate-like member substantially covers an opening defined by the hub at a mounting location for the inner bearing ring, but also includes at least one opening to provide access to the hub. Such an arrangement is particularly advantageous when a hydraulic drive system is used because it provides a large surface for mounting accumulators, hoses, manifolds, and other components of the drive system. The components may be mounted to the first coupling member prior to installation in a more controlled or desirable environment (e.g., one with more space and tools readily available).

These and other advantages will be more apparent based on the description below.

DETAILED DESCRIPTION

Figure 1:
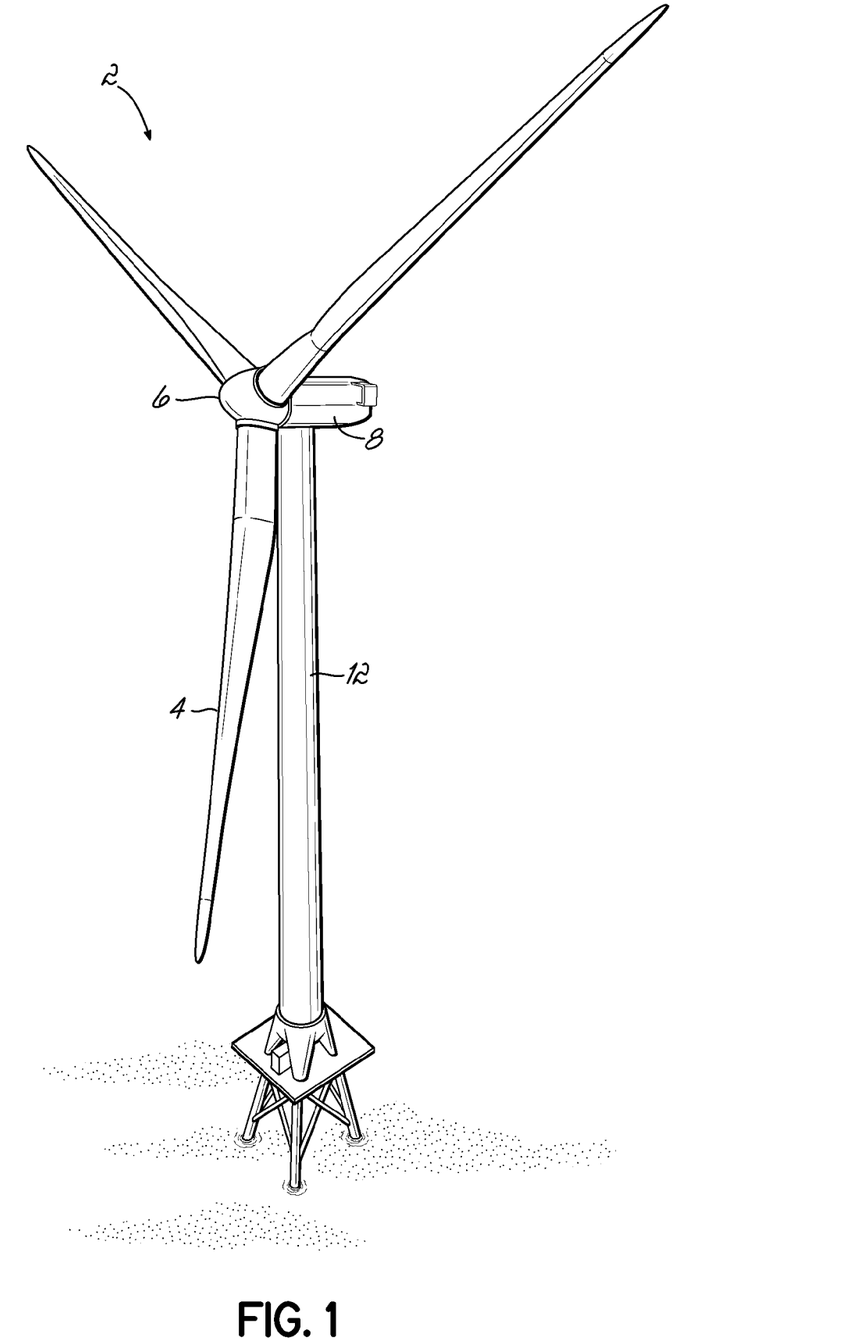
FIG. 1 is a perspective view of a wind turbine according to one embodiment.

FIG. 1 shows one example of a wind turbine 2. Although an offshore wind turbine is shown, it should be noted that the description below may be applicable to other types of wind turbines. The wind turbine 2 includes a rotor having blades 4 mounted to a hub 6, which is supported by a nacelle 8 on a tower 12. Wind causes the rotor to rotate about a main axis. This rotational energy is delivered to a power transmission system housed within the nacelle 8, where the energy is then converted into electrical power.

The blades 4 are mounted to the hub 6 by respective blade bearings so that the blades 4 can be pitched into or out of the wind. Pitching changes the amount of lift created by the wind and driving the rotation of the rotor. Thus, pitch systems between the blades 4 and hub 6 may be used to help control the wind turbine and optimize power production. Although pitch systems are well-known, the description below focuses on a pitch system having a particular arrangement so that certain advantages may be obtained. These advantages will be more apparent based on the description below.

Figure 2:
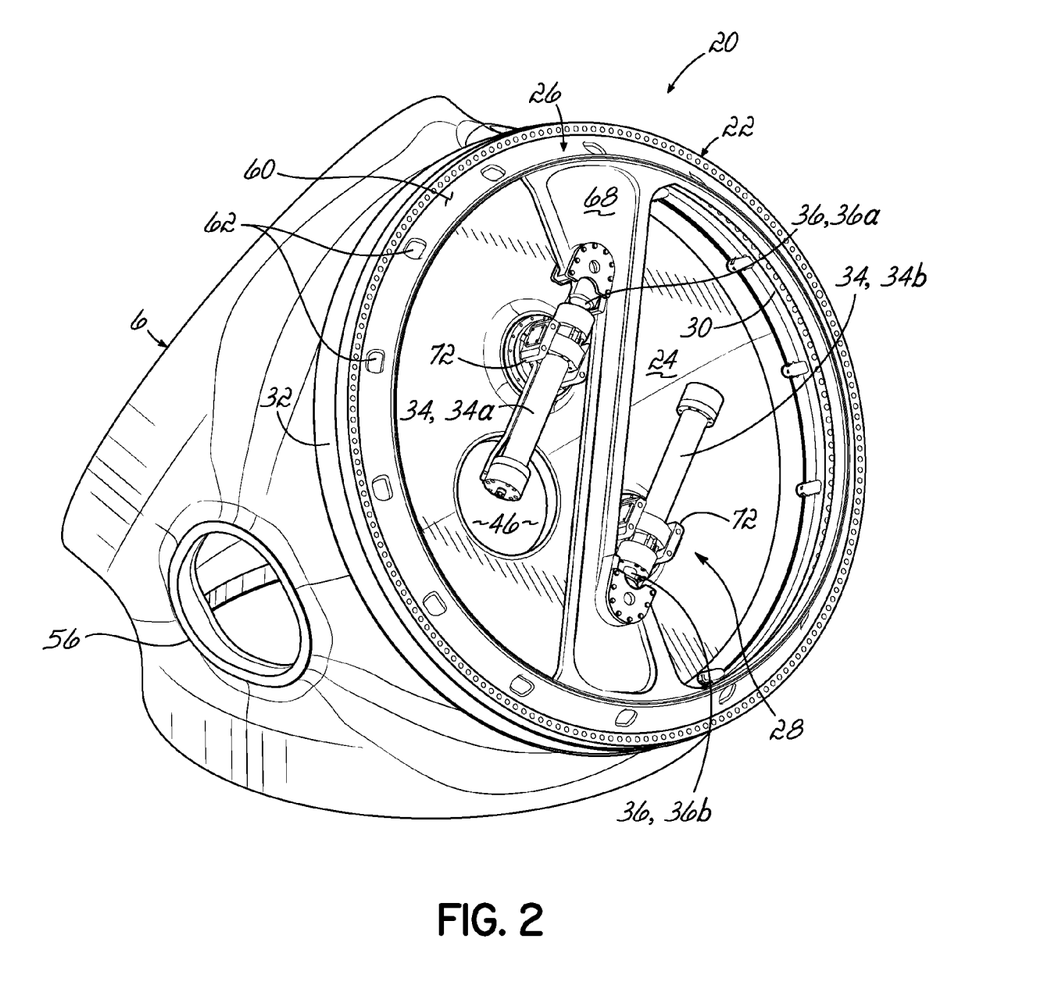
FIG. 2 is a perspective view of a pitch system for the wind turbine of FIG. 1.
Figure 3:
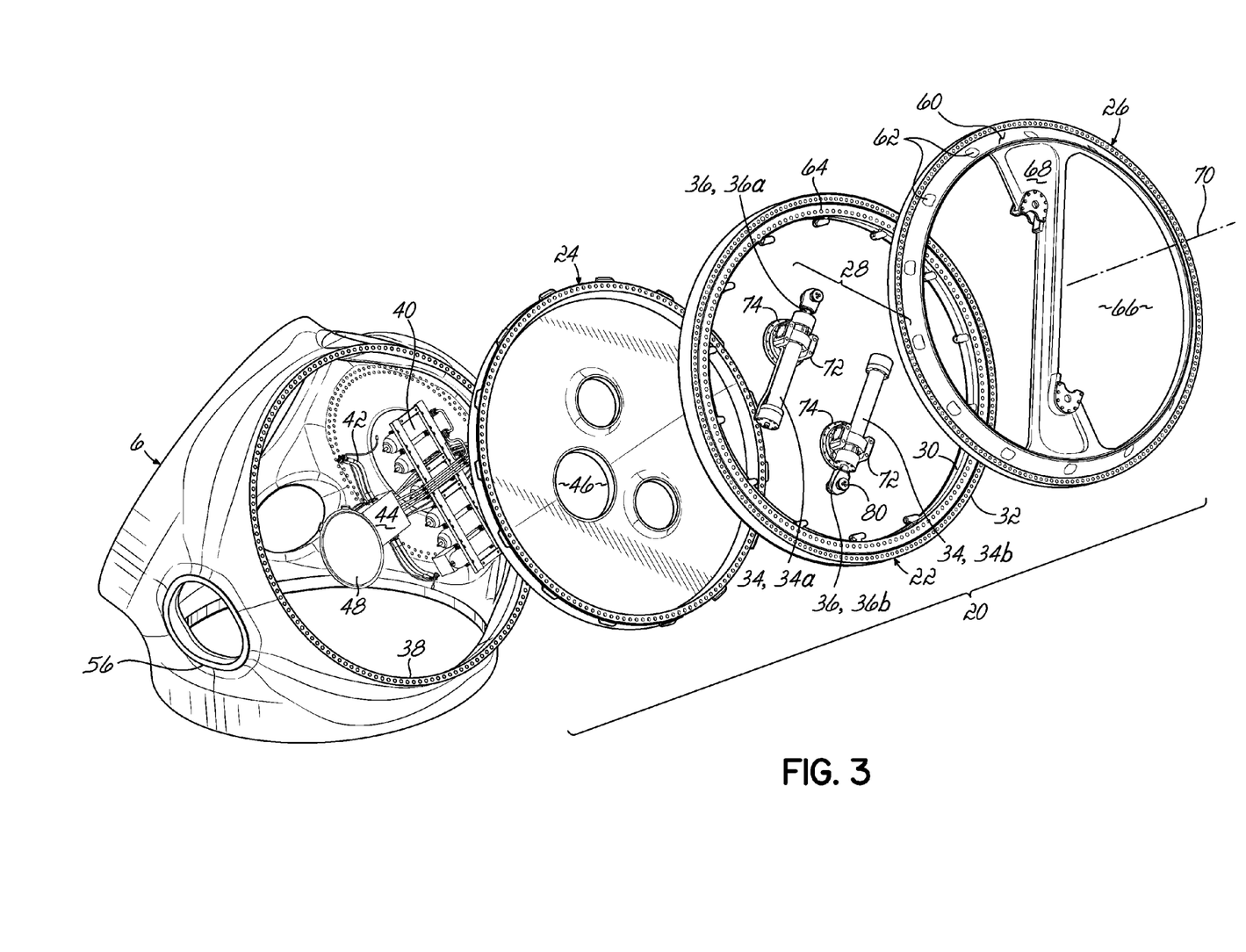
FIG. 3 is an exploded perspective view of the pitch system shown in FIG. 2.
Figure 4:
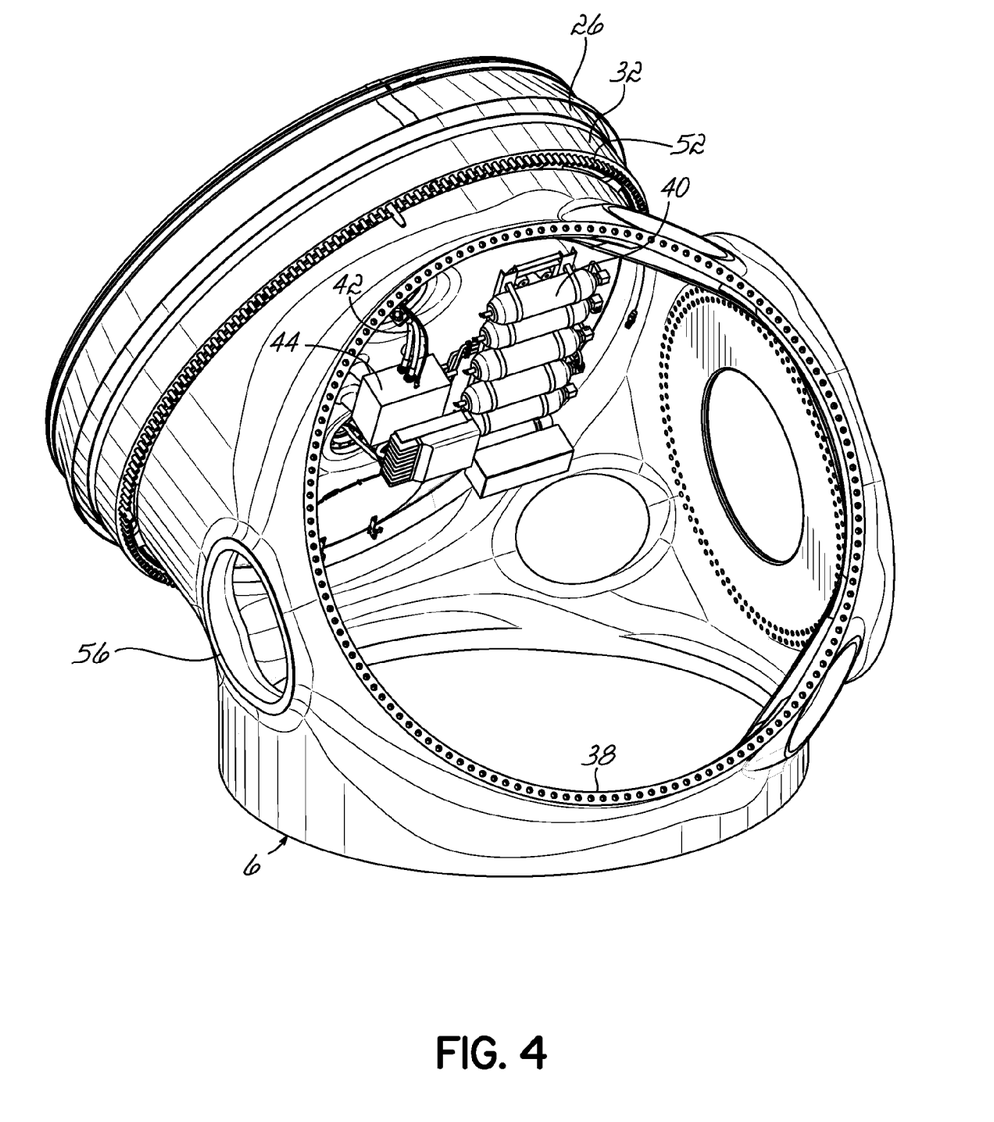
FIG. 4 is another perspective of the pitch system shown in FIG. 2.

In FIG. 1, the hub 6 is shown with an outer cover ("spinner"). FIGS. 2-4, however, illustrate the hub 6 with the outer cover removed so that a pitch system 20 for one of the blades can be seen in further detail. Similar pitch systems may be provided for each of the blades 4 (not shown in FIGS. 2-4). The pitch system 20 includes a bearing 22, first and second coupling members 24, 26, and a drive system 28. More specifically, the bearing 22 includes an inner bearing ring 30 mounted to the hub 6 and an outer bearing ring 32 mounted to the blade. The first coupling member 24 is positioned between the hub 6 and the inner bearing ring 30. The second coupling member 26 is positioned between the blade 4 and outer bearing ring 32. The drive system 28 is connected to the first and second coupling members 24, 26 so that the drive system 28 can rotate the inner bearing ring 30 relative to the outer bearing ring 32 and thereby pitch the blade 4 relative to the hub 6.

Advantageously, the drive system 28 is located on the interior of the hub 6, bearing 22, and/or blade 4. The first coupling member 24 extends radially inward to facilitate positioning the drive system 28 in this manner. The second coupling member 26 likewise extends radially inward, but additionally extends over the inner bearing 30 because of the connection between the second coupling member 26 and outer bearing ring 32. The drive system 28 includes at least one drive member 34 coupled to the first coupling member 24 and at least one driven member 36 coupled to the second coupling member 26. First and second drive members 34a, 34b are provided in the embodiment shown, each comprising a hydraulic cylinder. First and second driven members 36a, 36b are likewise provided, each comprising a piston rod configured to be moved by one of the hydraulic cylinders. Other drive systems not including hydraulic cylinders and piston rods are possible, as will be described in greater detail below.

When a hydraulically-operated drive system is provided, most or all of the equipment for operating the system may be conveniently mounted to the first coupling member 24. For example, the first coupling member 24 may be a plate-like member substantially covering an opening 38 to the hub 6 defined at the mounting location for the inner bearing ring 30 (and, therefore, covering an inside area of the bearing 22). Accumulators 40 (FIG. 4), hoses 42, manifolds 44, valves, etc. may all be mounted to the first coupling member 24. This may even be done prior to mounting the first coupling member 24 such that less work is required to complete the installation of the pitch system 20 when the blade 4 is mounted and space is more confined. Additionally, all or most of the equipment may be mounted to the side of the first coupling member 24 facing the hub 6 (i.e., the "underside") to provide easy access from within the hub 6 and facilitate service. In the embodiment shown, only the first and second drive members 34a, 34b and first and second driven members 36a, 36b are arranged on the side of the first coupling member 24 facing the blade 4. One or more openings 46 are provided in the first coupling member 24 to provide access to these components. The opening 46 may be covered by a removable cover 48.

The first coupling member 24 may be mounted to the hub 6 with the same bolts used to mount the inner bearing ring 30 to the hub 6. Thus, inner bolts 50 (FIG. 6) extend through the inner bearing 30, first coupling member 24, and into the hub 6. Other designs are possible, however. Indeed, the first coupling member 24 may alternatively be a flange or other structure integrally formed with the hub 6 or inner bearing ring 30. The first coupling member 24 may also be a ring-like member or intermediate part having a shape different than what is shown. It is desirable, however, for the first coupling member 24 to be shaped in a manner that provides additional reinforcement/stiffness to the hub 6 at the mounting locations for the bearings 22.

Similar statements can be made with respect to the second coupling member 26. That is, the second coupling member 26 may be a separate component mounted between the outer bearing ring 32 and blade 4, as shown, or an integral portion of either the outer bearing ring 32 or blade 4. If a separate component, the second coupling member 26 may be mounted with the same bolts used to mount the outer bearing ring 32 to the blade 4. Thus, outer bolts 52 extend through the outer bearing ring 32 and second coupling member 26 before engaging bolt holes in a root portion of the blade. As shown in FIG. 4, the outer bolts 52 may be inserted from an underside of the outer bearing ring 32 if the bolt holes in the root portion (not shown) are blind bores. Although this presents challenges in terms of access due to the underside of the outer bearing ring 32 being located exterior to the hub 6, these challenges may be addressed by providing one or more openings 56 in the hub 6 between blade-mounting locations. The openings 56 provide access to the underside of the outer bearing rings 32 (and, therefore, the outer bolts 52) from the interior space of the hub 6.

Referring back to FIGS. 2 and 3, the second coupling member 26 includes an annular portion (or "annulus structure") 60 overhanging the inner bearing ring 30. The annular portion 60 has a plurality of holes 62 each substantially axially aligned with at least one bolt hole 64 on the inner bearing ring 30 to provide access to the inner bolts 50 from a space above the second coupling member 26. The annular portion 60 itself defines an opening 66, which is spanned by a beam portion (or "beam structure") 68 of the second coupling member 26. In addition to reinforcing/stiffening the outer bearing ring 32, other advantages associated with such an arrangement will be more apparent based on the description of the drive system 28 below. Like the first coupling member 24, however, the second coupling member 26 may alternatively have a shape different than what is shown (e.g., if the particular advantages associated with the shape shown in the figures are not required or desired).

The first and second drive members 34a, 34b are coupled to the first coupling member 24 in a manner that allows rotation about an axis parallel to a rotational axis 70 of the bearing 22. Various ways of providing this relative rotation will be appreciated. For example, the first and second drive members 34a, 34b may each be supported by a frame 72 mounted to the first coupling member 24 by a bearing 74. Additional rotational degrees-of-freedom may be provided, such as the first and second drive members 34a, 34b being able to rotate or "teeter" about an axis substantially perpendicular to the rotational axis 70 of the bearing 22. In the embodiment shown, this is achieved by the first and second drive members 34a, 34b each including trunnions or mounting arms rotatably supported by the corresponding frame 72.

The first and second driven members 36a, 36b are likewise coupled to the beam portion 68 of the second coupling member 26. Specifically, the coupling arrangement between the first and second driven members 36a, 36b and the second coupling member 26 also allows relative rotation about an axis parallel to the rotational axis 70 of the bearing 22. The coupling arrangement may therefore include a bearing 80. Additional rotational degrees-of-freedom may be provided for this pivotal connection in alternative embodiments, for example, by the bearing 80 being spherical. The relative rotations provided by the couplings for the first and second drive members 34a, 34b and first and second driven members 36a, 36b allow linear motion to be translated into angular motion (i.e., rotation). When extended by the first and second drive members 34a, 34b, the first and second driven members 36a, 36b cause the outer bearing ring 32 to rotate relative to the inner bearing ring 30.

In relatively large wind turbines, significant forces may be required to pitch the blades due to their size and weight. Thus, the drive member(s) of a pitch system must be of a sufficient size to provide the required forces. Additionally, in hydraulic systems the piston rods must have a sufficient stroke length to provide the desired range of pitching (i.e., rotation of the bearing 22). Accommodating the size and stroke length of the drive system 28 presents challenges due to its position radially inward relative to the bearing 22. The back end of a cylinder, for example, should not contact the inner bearing ring 30 and/or second coupling member 26 as the cylinder rotates relative to the first coupling member 24 to pitch the blade. Otherwise such contact would inhibit further rotation and pitching on the blade. These challenges are addressed in the embodiment shown in several ways.

For example, the fact that multiple drive members 34 (the first drive member 34a and second drive member 34b) are provided helps reduce the overall size of each individual drive member. The forces required to pitch the blade can be split between the first and second drive members 34a, 34b so as to reduce the required capacity compared to arrangements involving a single drive member. Moreover, the first and second drive members 34a, 34b and first and second driven members 36a, 36b are arranged parallel to each other and evenly distributed around the rotational axis 70 of the bearing 22. In other words, the first and second drive members 34a, 34b are coupled to the first coupling member 24 at locations 180 degrees apart from each other in relation to the rotational axis 70 of the bearing 22. The first and second driven members 36a, 36b are also coupled to the second coupling member 26 at locations 180 degrees apart from each other in relation to the rotational axis 70 of the bearing 22. The symmetrical arrangement allows the first and second drive members 34a, 34b to evenly contribute to the pitching of the blade.

Figure 5:
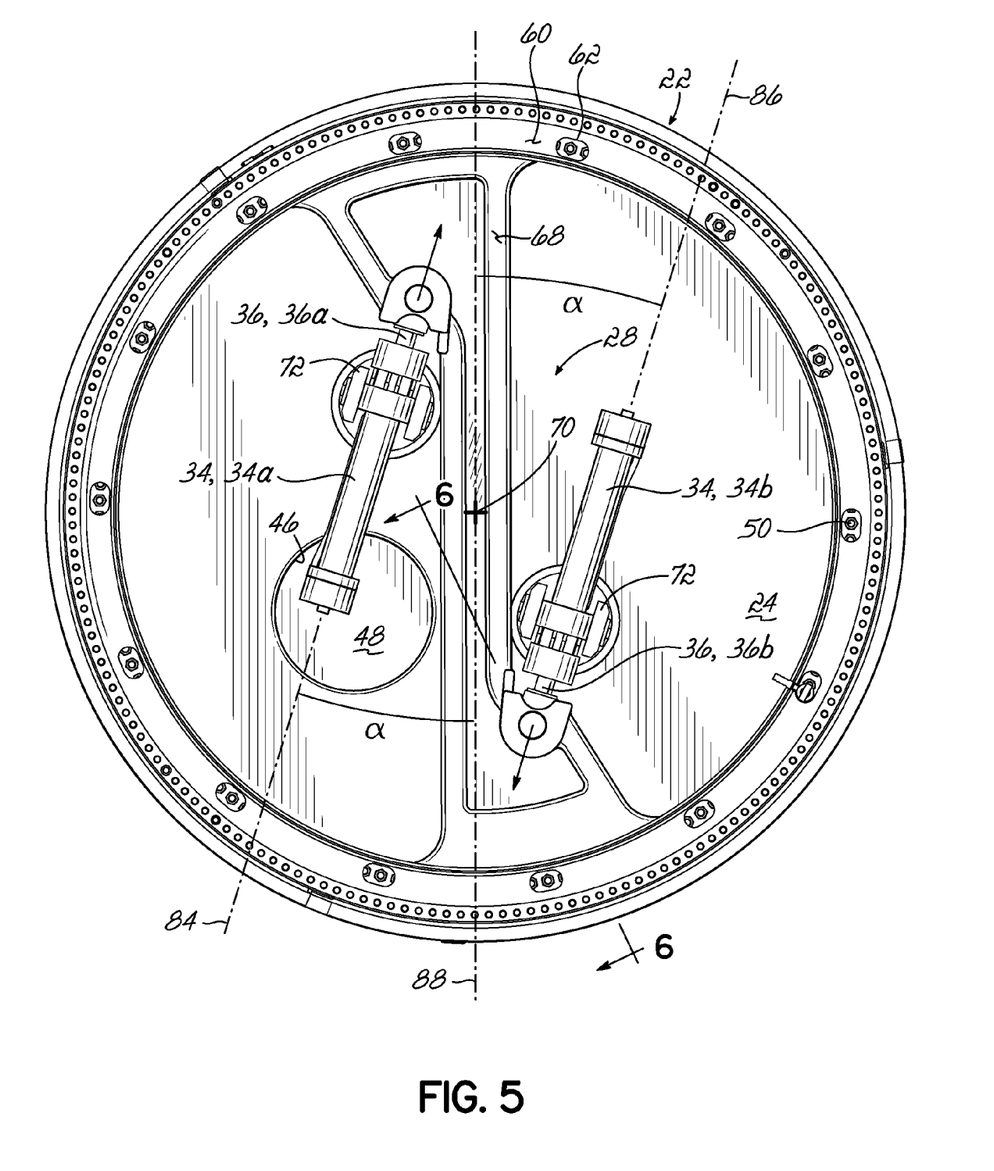
FIG. 5 is an elevational view of the pitch system shown in FIG. 2.

Contact between the back ends of the first and second drive members 34a, 34b and the inner bearing ring 30 and/or second coupling member 26 may be avoided by arranging the first and second drive members 34a, 34b at a relatively sharp angle in relation to a diameter of the bearing 22. This can best be seen with reference to FIG. 5. The first drive member 34a and first driven member 36b apply forces to the second coupling member 26 along a first axis (or "line of action") 84. The second drive member 34b and second driven member 36b apply forces to the second coupling member 26 along a second axis (or "line of action") 86. An angle α is defined between each of the first and second axis 84, 86 and a main axis 88 of the beam portion 68. The main axis 84 is located in a radial plane of the bearing 22 and, therefore, is aligned with a diameter of the bearing 22.

In a nominal position of the pitch system 20 (e.g., when the first and second driven members 36a, 36b are fully retracted in the first and second drive members 34a, 34b), angle α is less than 90 degrees. In certain embodiments, angle α may be between 20-40 degrees. Smaller angles result in the back ends of the first and second drive members 34a, 34b being oriented toward portions of the second coupling member 26 that are further away. The distance between the back ends and the inner bearing ring 30 and/or annular portion 60 of the second coupling member 26 will decrease as the linear motion of the first and second driven members 36a, 36b is converted into angular motion. As mentioned above, the first and second drive members 34a, 34b rotate about an axis parallel to a rotational axis 70 of the bearing 22 to permit this angular motion. This results in the back ends swinging toward closer portions of the second coupling member 26. Selecting relatively small angle α (e.g., less than 90 degrees, and preferably between 20-40 degrees) helps achieve the desired range of pitching before contact with the annular portion 60 and/or the inner bearing ring 30 occurs.

Figure 5A:
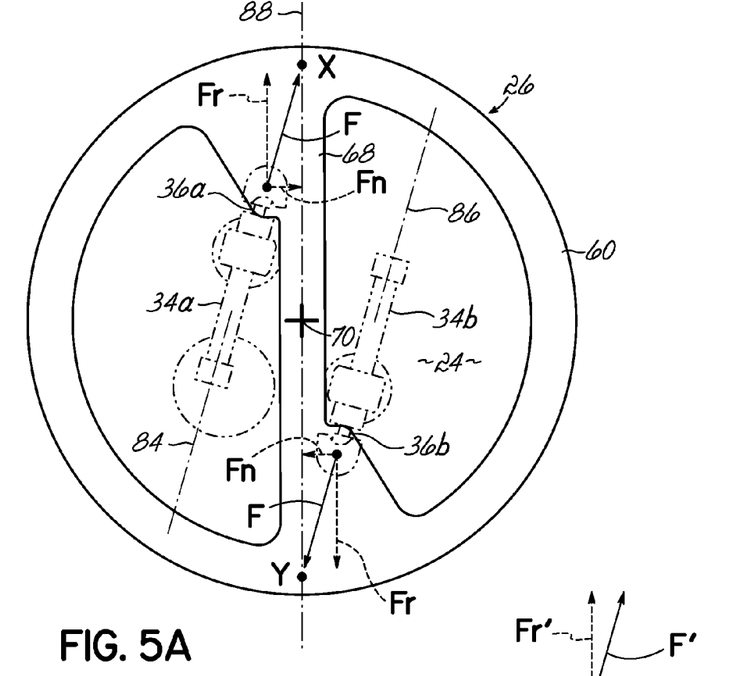
FIGS. 5A and 5B are schematic views how forces are applied in the pitch system of FIG. 2
Figure 5B:
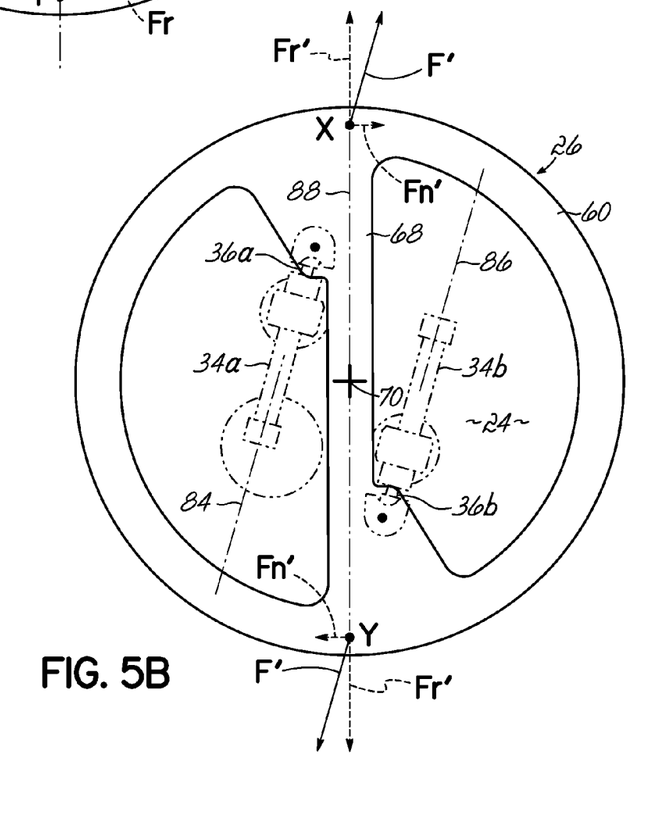

One of the difficulties or competing considerations in arranging the first and second drive members 34a, 34b at a relatively sharp angle relative to a diameter of the bearing 22 is that less force acts perpendicular to the diameter (i.e., less force contributes to the moment about the rotational axis 70). In other words, greater forces are required to produce the same moment as arrangements where the angle is not as small. One of the reasons this presents a challenge is because the forces also have radial components that do not contribute to the rotation of the bearing 22. These radial components may have the tendency to pull the bearing 22 in opposite directions and cause an oval-like distortion if applied to the bearing 22. FIGS. 5A and 5B are schematic views of the pitch system 20 illustrating the forces applied by the drive system 28 and how the beam portion 68 of the second coupling member 26 helps prevent this.

In FIG. 5A, radial components (Fr) and normal components (Fn) of the forces (F) applied by the first and second drive members 34a, 34b are shown. The second coupling member 26 essentially acts like a two-force member that primarily applies these forces to the outer bearing ring 32 at points X and Y, as shown in FIG. 5B. The normal components Fn' at these points of application create a moment about the rotational axis 70 that drives the rotation of the outer bearing ring 32 relative to the inner bearing ring 30. The radial components Fr' do not contribute to this rotation. Although the radial components act in opposite directions, they are not applied to the outer bearing ring 32 because the beam portion 68 allows them to cancel each other out. Thus, coupling the first and second driven members 36a, 36b to the beam portion 68 reduces or eliminates concerns about radial components distorting the outer bearing ring 32. Large forces may still be applied by the first and second drive members 34a, 34b despite the relatively small angle α to ensure there is a sufficient moment for rotating the bearing 22.

Further advantages are obtained due to first axis 84 and second axis 86 intersecting the main axis 88 above the outer bearing ring 32 (i.e., at the points of application X and Y) in a nominal position of the pitch system. The first and second driven members 36a, 36b may be fully retracted in the first and second drive members 34a, 34b in the nominal position such that rotation of the bearing 22 is prevented in one direction. The bearing 22 still experiences loads during operation of the wind turbine. Some of the loads may be applied in the direction in which rotation is prevented. With the arrangement shown, however, moments about the points of application X and Y that might otherwise cause stress concentrations or other unwanted side-effects are reduced or eliminated.

Figure 6:
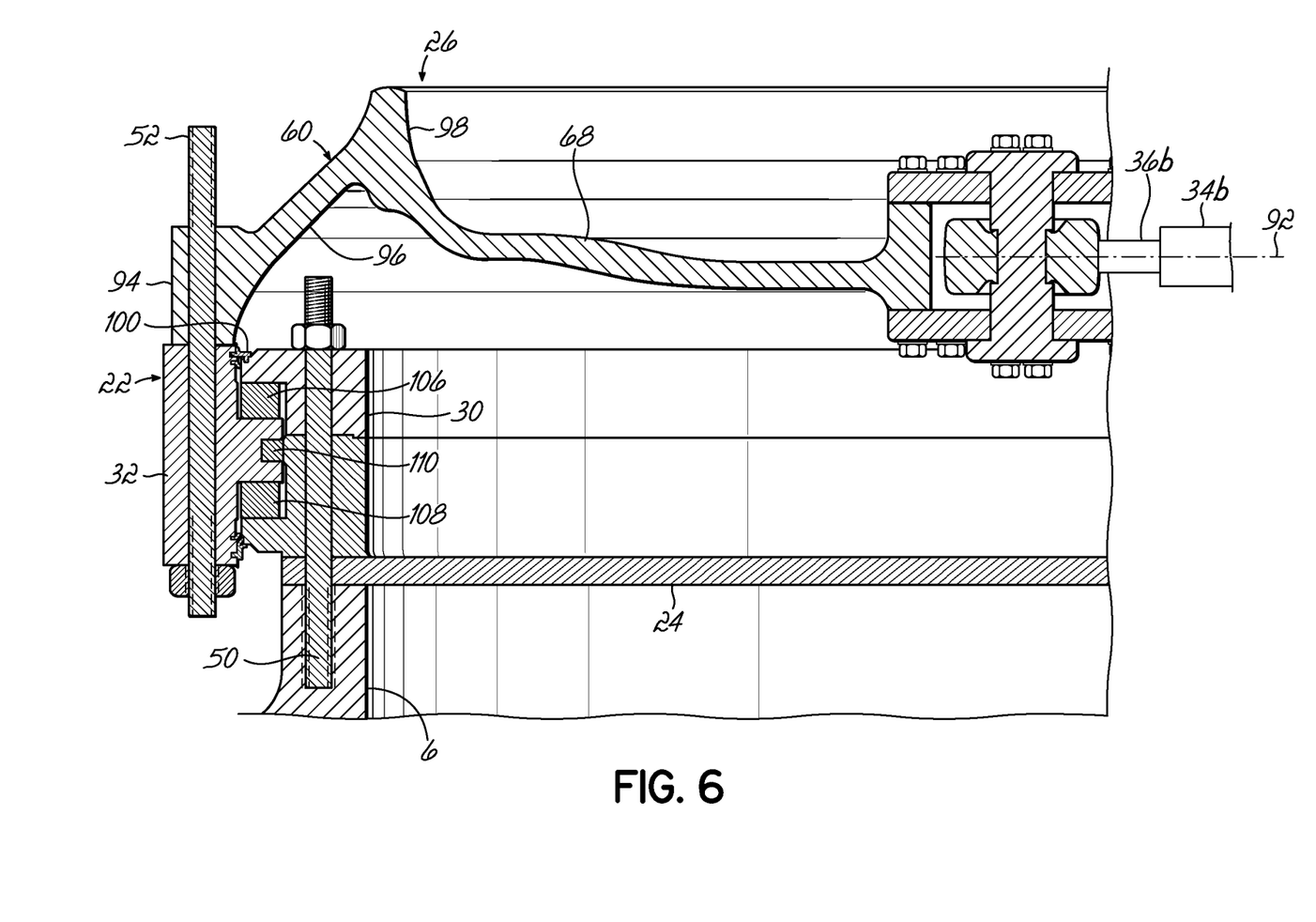
FIG. 6 is a cross-sectional view along line 6-6 in FIG. 5, showing a portion of the pitch system in further detail.

Additionally, as shown in FIG. 6, the first and second drive members 34a, 34b and first and second driven members 36a, 36b may be arranged in a plane 92 substantially perpendicular to the rotational axis 70 of the bearing 22. The plane 92 is offset from the bearing 22 in an axial direction due to the shape of the second coupling member 26. This helps protect the bearing in the event of deformations or the like. In particular, the components of the pitch system 20 may slightly deform because of the significant loads experience during operation of the wind turbine. Deformations may affect the application of forces discussed above with reference to FIGS. 5A and 5B. For example, radial components of the applied forces may not be entirely cancelled out. By offsetting the plane in which forces are applied from the bearing, the effects of potential parasitic forces can be minimized. The second coupling member 26 may be designed to flex or otherwise alleviate the forces so that they are not transferred directly to the outer bearing ring 32.

In the embodiment shown, the annular portion 60 of the second coupling member 26 includes a peripheral flange 94 having a first thickness, an extension 96 having a second thickness, and an inner flange 98 having a third thickness. The second thickness is less than the first and third thicknesses to provide flexibility in the axial direction. The peripheral flange 94 and/or inner flange 98 help ensure the second coupling member 26 remains stiff in the radial and circumferential direction. The extension 96 extends in the axial direction as it extends radially inward from the outer bearing ring 32. Accordingly, in addition to providing flexibility in the axial direction, such an arrangement facilitates access to the inner bolts 50 and a bearing seal 100 between the inner bearing ring 30 and outer bearing ring 32.

Still referring to FIG. 6, the bearing 22 may be a three-row roller bearing where the outer bearing ring 32 is generally T-shaped in cross-section. The inner bearing ring 30 is generally C-shaped in cross-section and positioned around a portion of the outer bearing ring 32 so as to define first and second overlap regions. First and second rows of rolling bodies 106, 108 are positioned in the respective first and second overlap regions, while a third row of rolling bodies 110 is positioned between the first and second overlap regions. The rolling bodies are shown in the form of cylindrical roller elements, although spherical roller elements, tapered roller elements, balls, and combinations of these various rolling bodies may be used instead. The inner bearing ring 30 and outer bearing ring 32 may also have a more conventional, cylindrical design. For example, in an alternative embodiment, the bearing 22 may be a three-row, spherical ball bearing. Furthermore, other embodiments may involve only one or two rows of rolling bodies.

Figure 7:
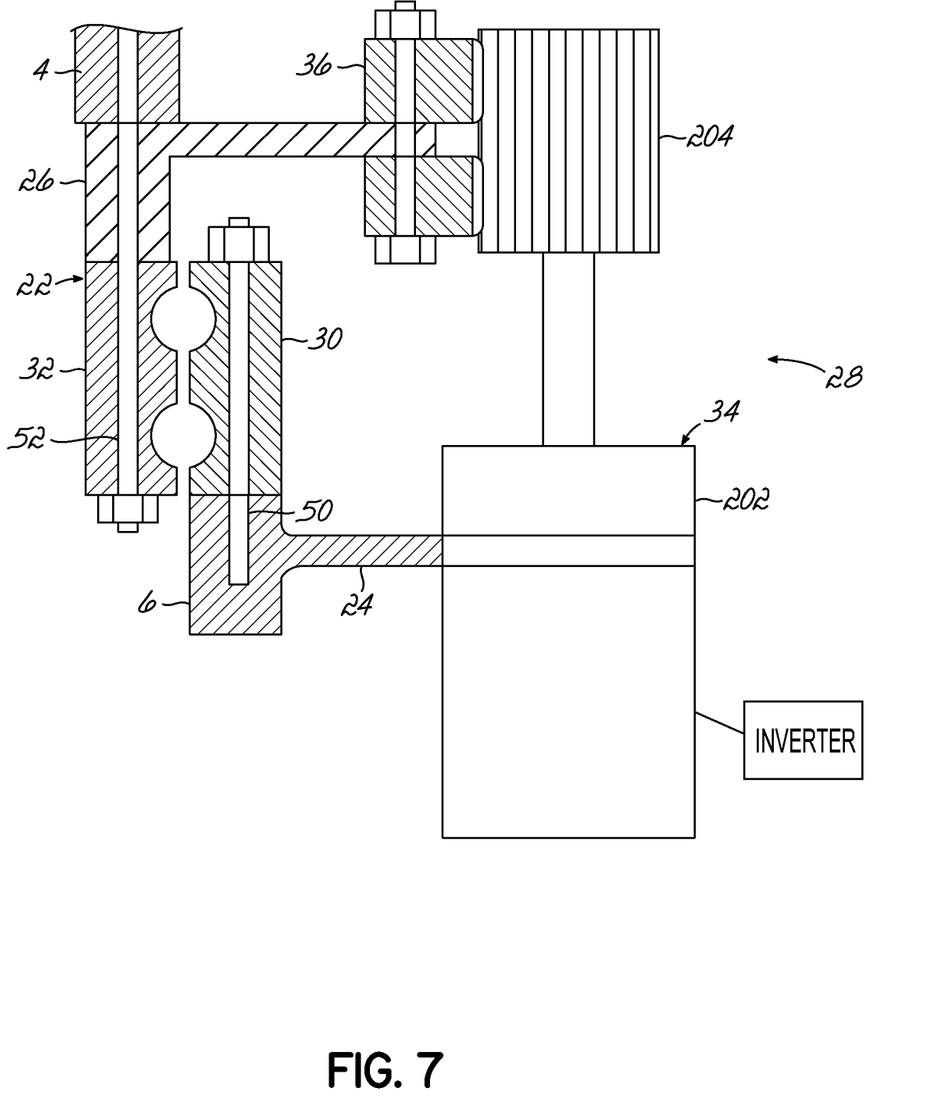
FIG. 7 is cross-sectional view of a portion of a pitch system according to an alternative embodiment.

Indeed, the embodiments described above are merely examples of the invention defined by the claims that appear below. Those skilled in the design of wind turbines will appreciate additional examples, modifications, and advantages based on the description. FIG. 7, for example, illustrates an alternative embodiment incorporating several variants of previously-discussed elements. Similar reference numbers are used in the figure to refer to corresponding structure. As can be seen, in this embodiment the drive system 28 is electric. A drive member 34 comprising a motor 202 and pinion 204 is coupled to the first coupling member 24, which is shown as being integrally formed with the hub 6. A driven member 36 comprising one or more pitch gears is coupled to the second coupling member 26. Reference can be made to U.S. Provisional Patent Application No. 61/420,940 and U.K. Patent Application No. 1020828.8 for further description of such a drive system. The bearing 22 in the embodiment shown in FIG. 7 is a two-row ball bearing.

Again, the details of any particular embodiment should not be seen to necessarily limit the scope of the claims below. In addition to appreciating other modifications and variations, skilled persons will understand how features of the various embodiments may be combined in different ways.

The invention claimed is:

1. A pitch system for rotating a blade of a wind turbine relative to a hub, the pitch system comprising:
   a bearing including an inner bearing ring configured to be mounted to the hub and an outer bearing ring configured to be mounted to the blade, the outer bearing ring being rotatable relative to the inner bearing ring to pitch the blade relative to the hub;
   a first coupling member configured to be positioned between the hub and inner bearing ring and extend radially inward of the hub;
   a second coupling member configured to be positioned between the blade and outer bearing ring, the second coupling member extending radially inward and over the inner bearing ring; and
   a drive system having a first drive member coupled to the first coupling member and a first driven member coupled to the second coupling member, the first drive member being configured to move the first driven member to rotate the outer bearing ring relative to the inner bearing ring,
   wherein the first drive member comprises a hydraulic cylinder and the first driven member comprises a piston rod coupled to the first drive member.

2. The pitch system according to claim 1, wherein the drive system further comprises a second drive member coupled to the first coupling member and a second driven member coupled to the second coupling member.

3. The pitch system according to claim 2, wherein the first and second driven members are arranged parallel to each other.

4. The pitch system according to claim 2, wherein the second coupling member includes an annular portion overhanging the inner bearing ring and a beam portion spanning an opening defined by the annular portion, the first and second driven members being coupled to the beam portion.

5. The pitch system according to claim 4, wherein the beam portion extends along a main axis, the first drive member and first driven member are arranged along a first axis that intersects the main axis at a location over the outer bearing ring, and the second drive member and second driven member are arranged along a second axis that intersects the main axis at a location over the outer bearing ring.

6. The pitch system according to claim 2, wherein the first and second driven members are arranged in a plane substantially perpendicular a rotational axis of the bearing, the plane being offset from the bearing in an axial direction.

7. The pitch system according to claim 6, wherein at least a portion of the second coupling member extends in the axial direction as it extends radially inward from the outer bearing ring so as to provide a conical shape with sloping sides.

8. The pitch system according to claim 2, wherein the second drive member comprises a hydraulic cylinder and the second driven member comprises a piston rod coupled to the first drive member.

9. The pitch system according to claim 2, wherein the first and second drive members are movably coupled to the first coupling member.

10. The pitch system according to claim 9, wherein the first and second drive members are rotatably coupled to the first coupling member so as to allow rotation about an axis parallel to a rotational axis of the bearing.

11. The pitch system according to claim 1, wherein the bearing includes first, second, and third rows of rolling bodies between the inner bearing ring and outer bearing ring.

12. The pitch system according to claim 11, wherein the outer bearing ring is generally T-shaped and the inner bearing ring is generally C-shaped, the inner bearing ring being positioned around a portion of the outer bearing ring so as to define first and second overlap regions, the first row of rolling bodies being positioned in the first overlap region, the second row of rolling bodies being positioned in the second overlap region, and the third row of rolling bodies being positioned between the first and second overlap regions.

13. The pitch system according to claim 1, wherein the bearing is a 2-ring pitch bearing.

14. The pitch system according to claim 1, wherein the first drive member is coupled to the first coupling member at a location configured to be positioned radially inward of the hub.

15. The pitch system according to claim 1, wherein the inner bearing ring and outer bearing ring lie within the same axial plane.

16. A pitch system for rotating a blade of a wind turbine relative to a hub, the pitch system comprising:
   a bearing including an inner bearing ring configured to be mounted to the hub and an outer bearing ring configured to be mounted to the blade, the outer bearing ring being rotatable relative to the inner bearing ring to pitch the blade relative to the hub;
   a first coupling member configured to be positioned between the hub and inner bearing ring and extend radially inward of the hub;
   a second coupling member configured to be positioned between the blade and outer bearing ring, the second coupling member extending radially inward and over the inner bearing ring; and
   a drive system having a first drive member coupled to the first coupling member and a first driven member coupled to the second coupling member, the first drive member being configured to move the first driven member to rotate the outer bearing ring relative to the inner bearing ring,
   wherein the inner bearing ring is configured to be mounted to the hub by a plurality of inner bolts extending through the inner bearing ring, the first coupling member, and a portion of the hub, and further wherein the second coupling member includes a plurality of holes substantially aligned with at least some of the inner bolts to provide access thereto.

17. A pitch system for rotating a blade of a wind turbine relative to a hub, the pitch system comprising:
   a bearing including an inner bearing ring configured to be mounted to the hub and an outer bearing ring configured to be mounted to the blade, the outer bearing ring being rotatable relative to the inner bearing ring to pitch the blade relative to the hub;
a first coupling member configured to be positioned between the hub and inner bearing ring and extend radially inward of the hub;
a second coupling member configured to be positioned between the blade and outer bearing ring, the second coupling member extending radially inward and over the inner bearing ring; and
a drive system having a first drive member coupled to the first coupling member and a first driven member coupled to the second coupling member, the first drive member being configured to move the first driven member to rotate the outer bearing ring relative to the inner bearing ring,
wherein the first coupling member comprises a plate member configured to be secured to the hub with bolts and substantially cover an inside area of the bearing, and wherein the plate member includes at least one opening configured to provide access to the hub.

18. A wind turbine, comprising:
a hub;
a blade rotatably mounted to the hub; and
a pitch system positioned between the blade and the hub, the pitch system comprising:
  a bearing including an inner bearing ring mounted to the hub and an outer bearing ring mounted to the blade, the outer bearing ring being rotatable relative to the inner bearing ring to pitch the blade relative to the hub;
  a first coupling member positioned between the hub and inner bearing ring and extending radially inward of the hub;
  a second coupling member positioned between the blade and outer bearing ring, the second coupling member extending radially inward and over the inner bearing ring; and
  a drive system having a first drive member coupled to the first coupling member and a first driven member coupled to the second coupling member, the first drive member being configured to move the first driven member to rotate the outer bearing ring relative to the inner bearing ring,
wherein the first drive member comprises a hydraulic cylinder and the first driven member comprises a piston rod coupled to the first drive member.

19. The wind turbine according to claim 18, wherein the outer bearing ring and second coupling member of the pitch system are mounted to the blade by a plurality of outer bolts extending through the outer bearing ring and second coupling member, and further wherein the hub includes an inner space and at least one opening providing access to the outer bolts from the inner space.

20. The wind turbine according to claim 18, wherein the first coupling member comprises a plate member secured to the hub with bolts extending through the inner bearing ring and hub, the plate member substantially covering an opening defined by the hub at a mounting location for the inner bearing ring, and wherein the plate member includes at least one opening to provide access to the hub.

21. The wind turbine according to claim 18, wherein the first coupling member is formed integrally with the hub.

22. A pitch system for rotating a blade of a wind turbine relative to a hub, the pitch system comprising:
  a bearing including an inner bearing ring configured to be mounted to the hub and an outer bearing ring configured to be mounted to the blade, the outer bearing ring being rotatable relative to the inner bearing ring to pitch the blade relative to the hub;
  a first coupling member configured to be positioned between the hub and inner bearing ring and extend radially inward of the hub;
  a second coupling member configured to be positioned between the blade and outer bearing ring, the second coupling member extending radially inward and over the inner bearing ring; and
  a drive system having a first drive member coupled to the first coupling member and a first driven member coupled to the second coupling member, the first drive member being configured to move the first driven member to rotate the outer bearing ring relative to the inner bearing ring,
wherein the outer bearing ring is configured to extend radially outward of the hub so that the outer bearing ring is not directly supported by the hub.

23. The pitch system according to claim 22, wherein the first drive member comprises a motor and pinion, and further wherein the first driven member comprises a pitch gear.

* * * * *